Sept. 8, 1925.
L. AKERBLADH
1,552,406
EDUCATIONAL GAME
Filed Aug. 16, 1921 5 Sheets-Sheet 1
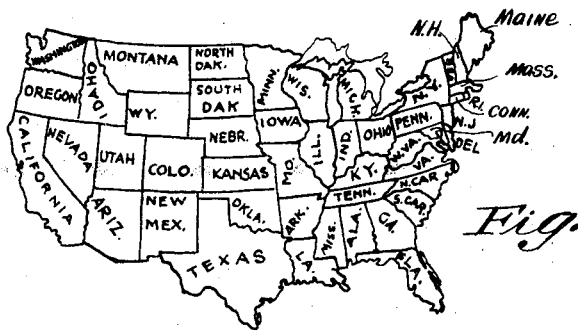
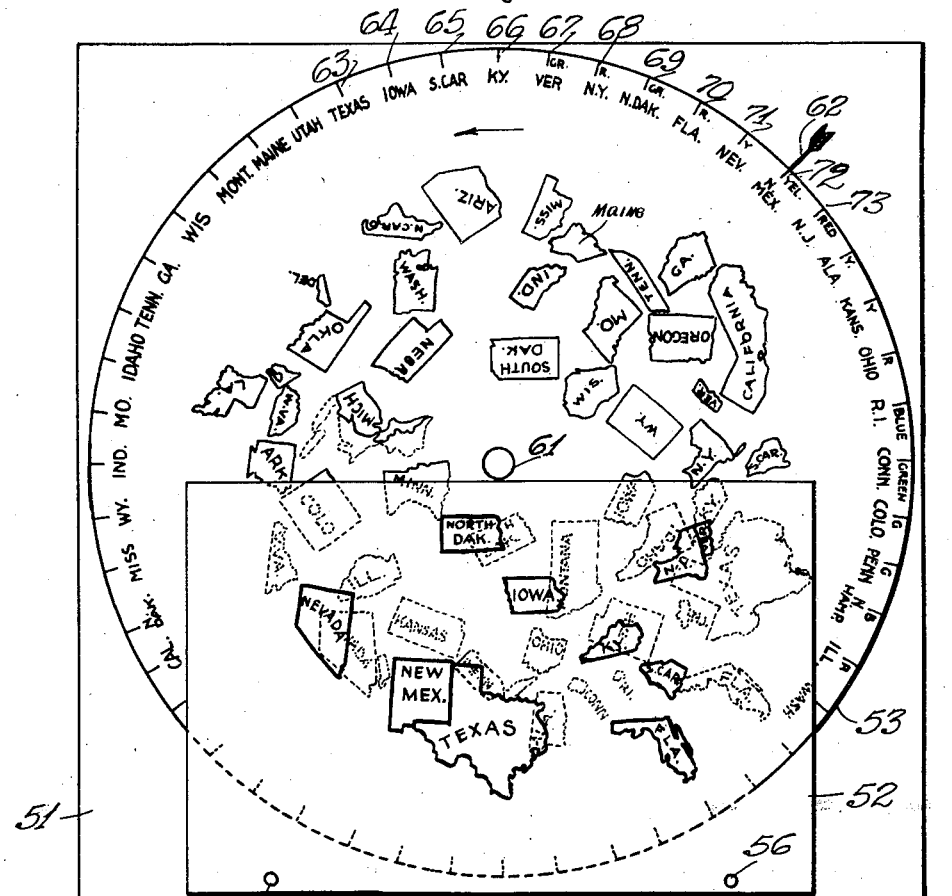

Sept. 8, 1925.

L. AKERBLADH 1,552,406

EDUCATIONAL GAME

Filed Aug. 16, 1921      5 Sheets-Sheet 2

Inventor,
Leon Akerbladh
By M. N. Loughridge His Attorney.

Sept. 8, 1925.

L. AKERBLADH

EDUCATIONAL GAME

Filed Aug. 16, 1921

1,552,406

5 Sheets-Sheet 3

Inventor,
Leon Akerbladh
By M. H. Loughridge
His Attorney

Sept. 8, 1925.

L. AKERBLADH 1,552,406

EDUCATIONAL GAME

Filed Aug. 16, 1921    5 Sheets-Sheet 4

Inventor,
Leon Akerbladh
By N. Vaughridge
His Attorney

Sept. 8, 1925.

L. AKERBLADH 1,552,406

EDUCATIONAL GAME

Filed Aug. 16, 1921     5 Sheets-Sheet 5

INVENTOR.
Leon Akerbladh
BY
ATTORNEY.

Patented Sept. 8, 1925.

1,552,406

UNITED STATES PATENT OFFICE.

LEON AKERBLADH, OF NEW YORK, N. Y., ASSIGNOR TO ALPHA GAME & TOY CO., INC., A CORPORATION OF NEW YORK.

EDUCATIONAL GAME.

Application filed August 16, 1921. Serial No. 492,681.

*To all whom it may concern:*

Be it known that I, LEON AKERBLADH, a subject of the King of Sweden, and resident of New York city, in the county of New York and State of New York, have invented certain new and useful Improvements in Educational Games, of which the following is a specification.

Figure 4:
Figure 3:
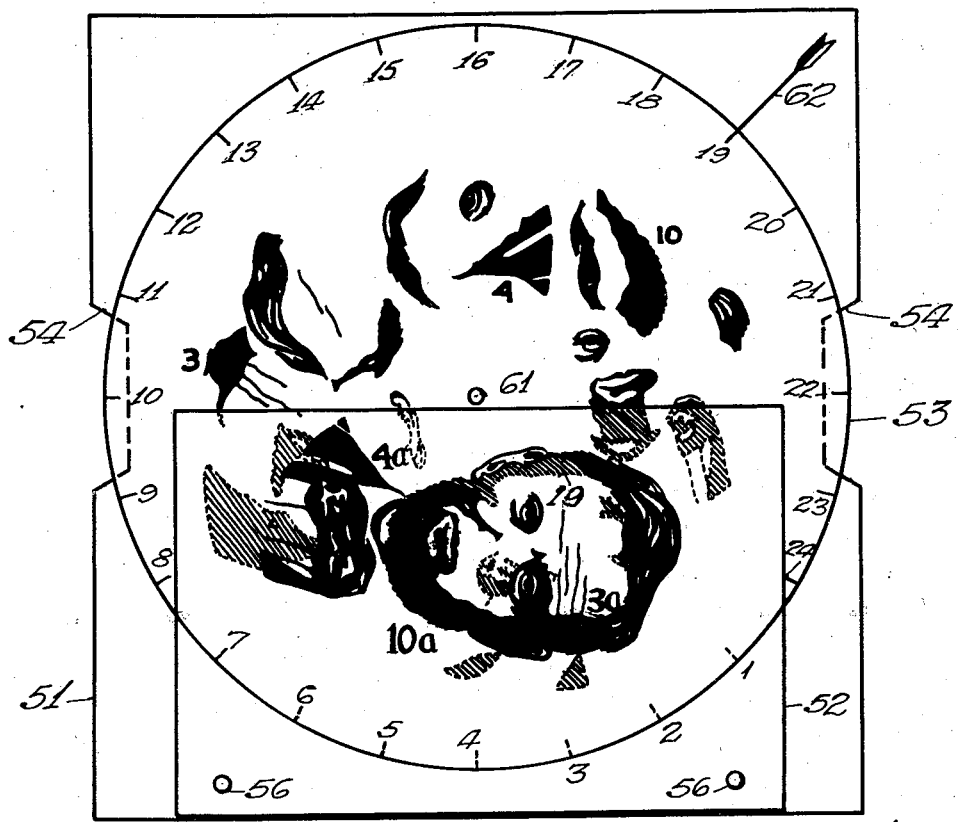
Figure 6:
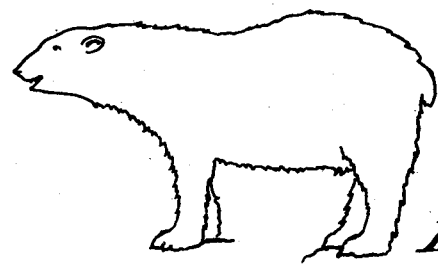
Figure 5:
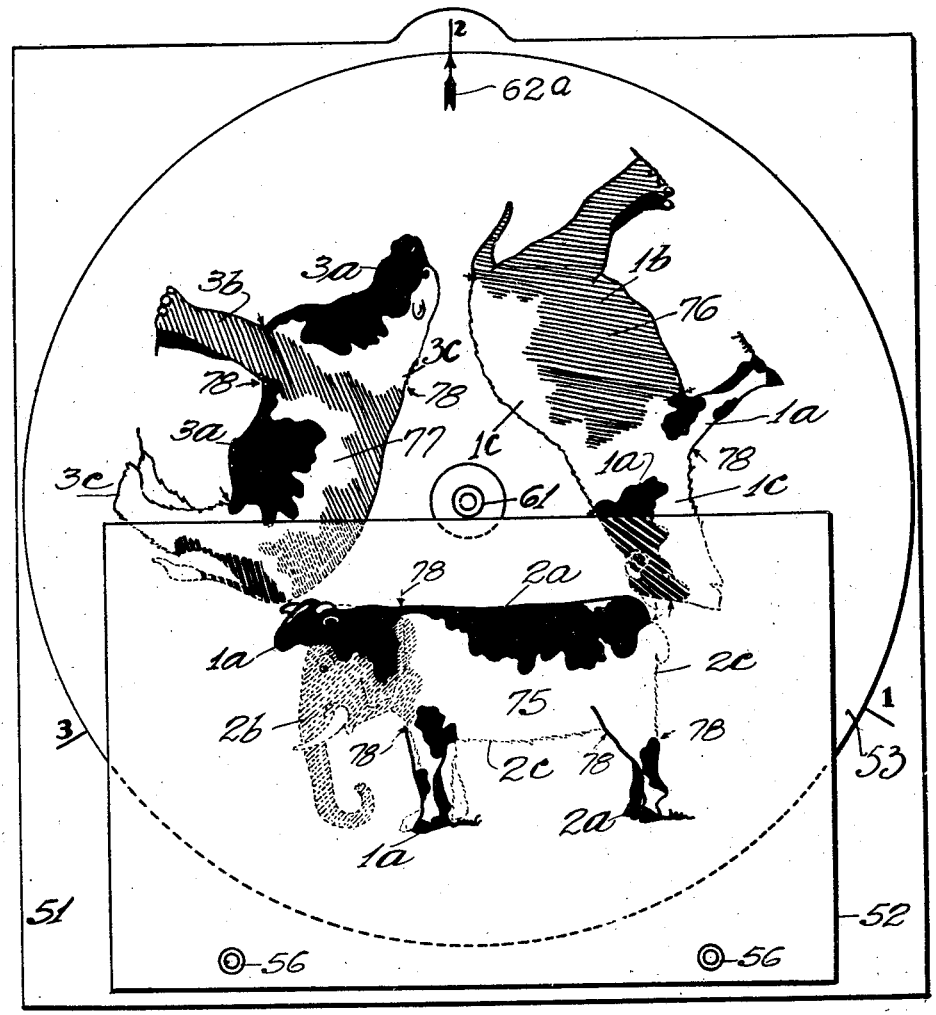
Figure 7:
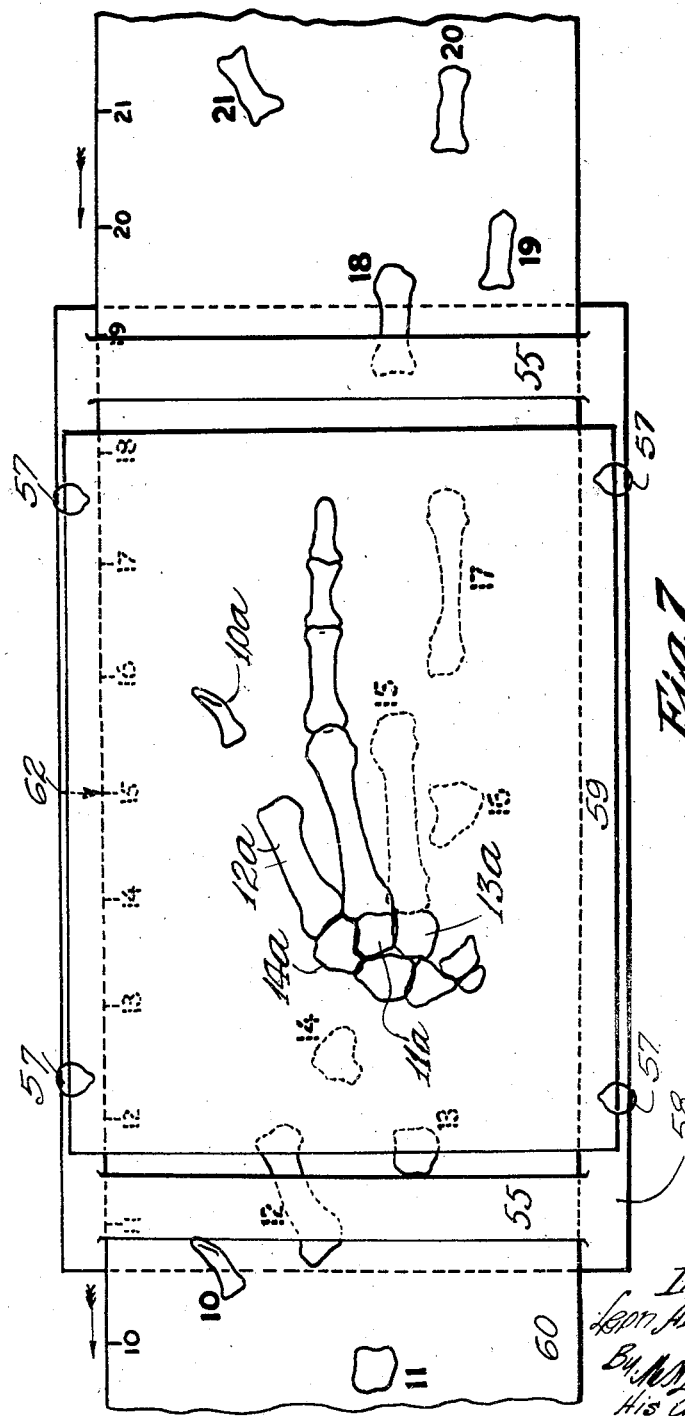
Figure 8:
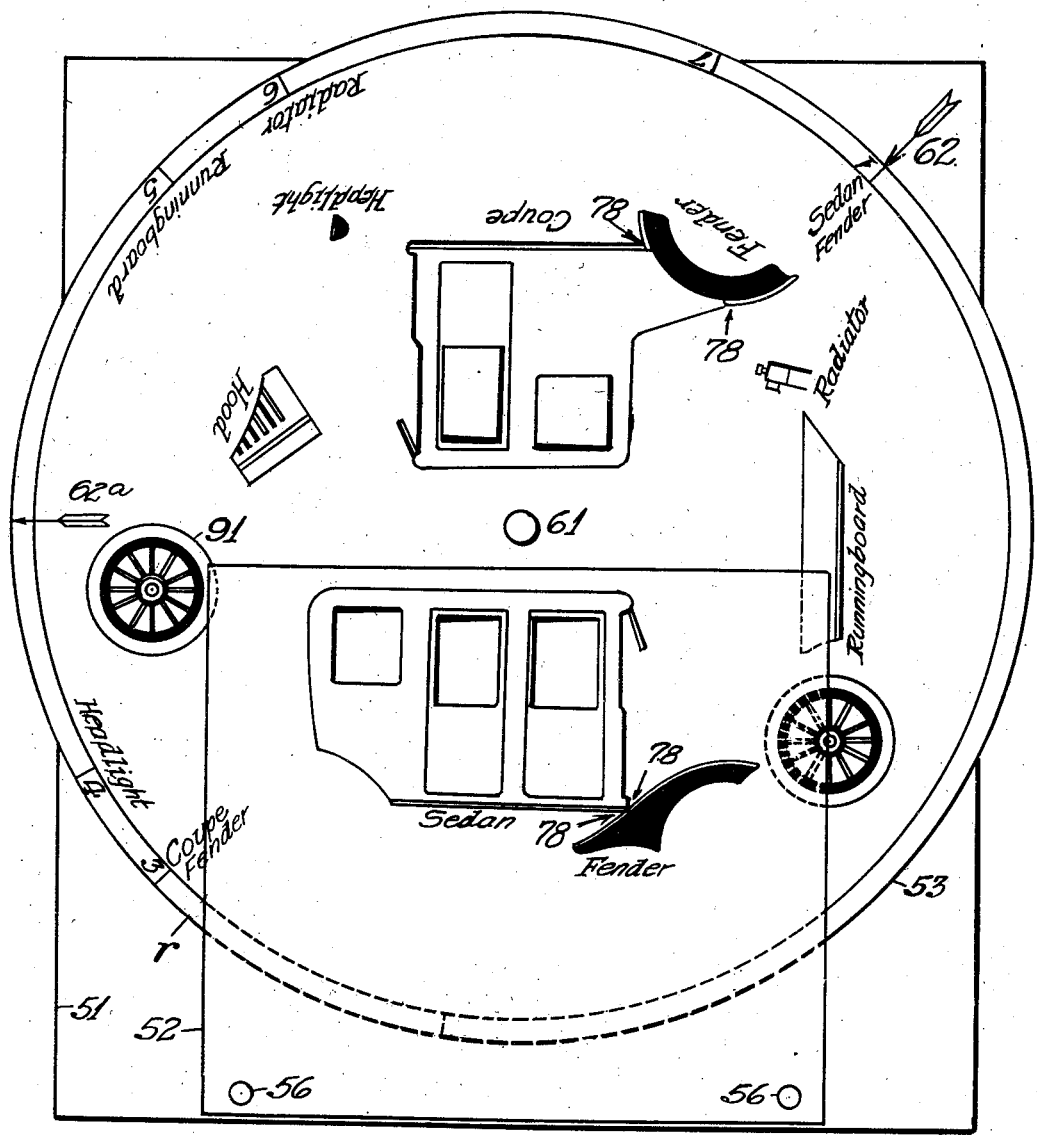

This invention relates to the class of educational games and may be used as a game or puzzle or a combination of both. Its use teaches drawing, promotes accuracy and may be applied to illustrate numerous subjects such as geography, anatomy, portrait work, mechanics and botany. It also may be applied to cartoons and comic pictures. This invention, while having an important educational value, is also highly entertaining and amusing and holds the attention of the operator in the results that may be expected and it has for an object to teach drawing, promote accuracy and provide a source of entertainment and education in the sciences and other subjects. These objects may be obtained by a construction as described in the following specification and shown in the accompanying drawings in which Fig. 1 shows one form of my invention ready for use and Fig. 2 shows results obtained with the invention as applied in Fig. 1. Fig. 3 shows my invention applied to portrait work and Fig. 4 is a portrait of Abraham Lincoln obtained from the arrangement shown in Fig. 3. Fig. 5 shows another application of my invention and Fig. 6 is one of the results that may be obtained from the arrangement shown in Fig. 5. Fig. 7 shows another modification of my invention in a somewhat cheaper form applied to the subject of anatomy, and Fig. 8 is an arrangement in which several of the features in the other illustrations are combined.

This invention consists broadly of three elements: first, a baseboard or support; second, a picture record; and third, a means whereby the picture on the picture record may be redrawn or assembled. The base consists of an ordinary plain board, usually of card-board, having a fixed guide and an index line thereon, positioned with relation to said guide. The picture record is movably mounted and may be rotated, slid, or otherwise moved to the position desired as controlled by the fixed guide. The means for transferring the picture subjects from the picture record may be carbon paper, tracing paper or similar material. This paper is preferably secured to the base-board so that it has a fixed relation with reference to the picture record.

A popular form of this device consists of a picture record in the form of a disk having the fixed guide of the base-board through its centre so that it may be rotated on the base-board and a pad of tracing paper clamped or otherwise secured to the edge of the base-board so that a sheet of tracing paper will cover approximately one-half of the disk. The disk or picture record may be provided with a number of index points around its circumference and each of these index points may be moved around to match the index line on the base-board. The picture record consists of a picture divided into parts and spread in mixed relation over the face of the disk. In one form of the invention the object is to reassemble a complete picture from these parts, and the index line and the index marks are used as an aid in securing these results. When a particular mark is matched with the index line a particular part of the drawing is correctly positioned with relation to all the other parts of the drawing and when this part is identified it may be traced on a sheet of the tracing pad, but no other part of the picture should be traced when the record is in this position. The record is then moved around to another index mark and the part corresponding with this mark is properly located with relation to the rest of the picture and should be traced on the tracing pad. When all the parts of the picture have thus been traced a completed picture is obtained, built up from its elementary parts. The index marks may also be used for other purposes in connection with the results to be obtained. For instance, the index marks may indicate a color which the parts represented by the index point should be colored, so that the final result will produce a colored picture.

This invention may be applied as a puzzle by omitting the identification marks of the part of the picture corresponding to the index marks on the circumference of the disk. Each position of the disk indicates where a portion of the picture may be drawn but the imagination of the operator is exercised in tracing the proper part for each location. Usually in puzzle records a few of the leading parts are provided with reference characters to act as a guide and form a foundation around which the other parts may be assembled. Another application of this invention consists in reassembling the component parts of a plurality of pictures into another picture to obtain a new result, each part being located by the index marks in its proper relation to the remainder of the picture.

Referring to Fig. 1, 51 represents the base-board or support for the picture record or disk 53 which is pivoted to rotate on a stud 61 firmly secured to the base-board 51. 62 represents the index line or arrow and is a mark on the base-board having a fixed relation with reference to stud 61. A pad of tracing paper 52 is secured to the lower edge of the base-board by the fasteners 56 which may be any of the well-known type of paper fasteners and should be applied so that pads may be readily changed and also so that they have no lost motion with reference to base-board 51.

The picture record 53 contains a map of the United States of America similar to Fig. 2, the various States being separated and spread over the face of the disk in mixed relation. A map made up in this way shows the comparative size and shape of every State and as the map is reassembled the position and relation of each State to the other States are impressed upon the mind of the user and after such uses are not readily forgotten. Around the circumference of the disk will be noted a row of index marks some of which are indicated by the reference characters 63 to 73 inclusive. 63 it will be noted is the index mark for Texas and when 63 matches with the index line 62, then the State of Texas should be traced on the pad 52. 64 is the index mark for Iowa and when this mark matches with the index line 62, the State of Iowa should be traced in the same way. 65 is the index line for South Carolina and when this mark matches with the index line 62, South Carolina should be traced and so on for the remaining index marks throughout the entire record. As shown it will be noted that the index mark 72 is positioned to match with index line 62 and when in this position New Mexico is correctly located adjacent the State of Texas. As shown in Fig. 1 the States from the index marks 63 to 72 are indicated by full lines on the pad 52 while the other States under the pad are indicated by dotted lines. In this way it can readily be seen how the various States are assembled in their correct relation to each other and the relative distance by which these various portions of the country are separated can also be shown.

It will be noted that on the index lines 67, 68, 69, 70, 71, 72 and 73 are letters indicating green, red and yellow, indicating thereby that when a colored picture is desired, a color corresponding to this index may be used for each part of the picture, thus producing a colored map. The color work may of course be applied after the outline is completed and in the case of tracing paper colors may be applied to the back with very effective results.

The illustration in Fig. 3 shows my invention used as a puzzle and including portrait work. In this application, a base-board similar to that shown in Fig. 1 is used, except that notches 54 are provided in the sides to facilitate rotating the record 53. The record in this application contains a portrait of Abraham Lincoln divided into twenty-four parts as indicated by the number of index lines on the circumference of the record. In the illustration in Fig. 3 nineteen of these parts have been assembled, the part 19 being in position for shading in as indicated. In order to guide the operator in this work the parts 3, 4, and 10 have been numbered so that the operator can trace the part 3 as indicated at 3$^a$, when the index mark 3 is on the index line 62 and the part 4 is traced as indicated at 4$^a$ when the index mark 4 is properly positioned; also the part 10 is located as shown at 10$^a$ with the index mark 10 on the index line 62. These parts as shown numbered 3, 4, and 10 may be given a name instead of a number and the remaining index marks around the circumference of the disk may be left blank and without any means of identifying the portion of the picture corresponding to any particular index mark other than a few of the leading parts. The operator thus must exercise his judgment in reassembling pictures in order to position each part correctly for each index mark on the record. If the result is known as for instance in a portrait, the leading features such as the eyes and ears can be readily located and the remaining parts which match up with these can be found by trial. In this way an unskilled operator can produce a portrait correctly proportioned and shaded. Records of this kind show how an artist obtains results by comparatively few lines enclosing a space. When these lines are separated they are entirely meaningless until reassembled in the proper manner.

The arrangement shown in Fig. 5 may be considered the inverse of the arrangement shown in Figs. 1 and 3 as this consists in sub-dividing a picture and reassembling it to produce a different result. In this picture a group of three composite animals is shown on the record 53. These three animals are made from a combination of an elephant, a bear and a Holstein bull and do not resemble any animals known in nature. The composite animals serve to show in a striking manner, the difference in shape of these animals. The base-board is provided with three index marks numbered 1, 2 and 3 against which the index arrow 62ª of the record is matched. Color is also used as an aid in the use of this record. If it is desired to draw a Holstein bull, index mark numbered 1 is placed against the index arrow 62ª and the portion 1ª is traced in in black and white, including part of the head and the forelegs. Arrow points indicated by 78 are shown in the various figures indicating the limits to which the object should be drawn in any position. When the record is rotated until index arrow 62ª matches with the line 2, then the portion 2ª, including the back and the hind legs is drawn and when the record is turned until index arrow 62ª is matched with the index line 3, the portion 3ª is traced, including the lower part of the head, the flank and the abdomen; thus completing the picture.

If it were desired to draw an elephant which is indicated by the shaded lines, then in the first position of the record, the portion 1ᵇ should be traced, in the second position of the record, the portion 2ᵇ should be traced and in the third position of the record, the portion 3ᵇ should be traced, thus completing an elephant and if desired to draw a polar bear as indicated in Fig. 6 which is shown by the outline and jagged lines indicating the fur, then in the first position of the record, the portion 1ᶜ should be traced, in the second position of the record, the portion 2ᶜ should be traced and in the third position of the record, the portion 3ᶜ should be traced; thus completing the picture.

The arrangement shown in Fig. 7 differs from the previous arrangements by substituting a record in the form of a continuous strip instead of a circular disk. This strip 60 is guided by raised strips 55 cut from the base-board 58 so that the strip may be moved back and forth in a horizontal plane. Index mark 62 is provided on base-board 58 as shown and paper clips 57 are provided to secure the sheet of tracing paper 59 between the strips 55. The record 60 shows the anatomy of the human hand and has a row of numbers on the upper edge running from 10 to 21, with index marks at each number which may be positioned opposite the index line 62. The record itself contains the various bones of the hand separately drawn and spaced from each other, each bone having a number corresponding with the index number, by which it is located with reference to the other bones. The terminal phalanx of thumb 10 is correctly positioned at 10ª, when the index mark 10 is under the index line 62. Similarly, the trapezoid bone 11 is correctly positioned at 11ª, also the metacarpal bone 12 is correctly positioned at 12ª, the os magnum 13 is positioned at 13ª and the trapezium bone 14 is positioned at 14ª and so on for the remaining bones of the skeleton. This arrangement has the advantage not only of exercising the mind in making a drawing of the anatomy of the hand, but the drawing of each bone may be separately removed from that of the other bones and thereby its shape and size can be determined without confusing the mind.

The illustration in Fig. 8 shows how two types of automobiles may be drawn from the same component parts. The disc 53 has index marks numbered from 1 to 7. Against the first six of these marks a name is placed corresponding with the name of the part in the disc which should be drawn when these marks are opposite the fixed index 62. The mark 1, for instance includes "sedan" and a "fender" and the mark 3 includes "coupe" and a "fender"; the fenders are component parts of the car whereas "sedan" and "coupe" are complete interchangeable body units. The wheel 90, it will be noted, is not named and is not identified with the index numbers on the disc. This wheel is positioned on the front of the vehicle when the index mark "7" matches with 62 and its proper location can easily be identified. The wheel 91 is neither named nor marked. This wheel is brought into position on the rear of the vehicle when the index arrow 62ª on the disc matches with the line r on the base board. The arrows 78 indicate the limits of the lines when the fenders are traced separately from the bodies. In the illustration the parts underlying the tracing sheet are shown dotted except "sedan" and "fender" which have been traced on the sheet.

This invention is equally applicable for illustrating mechanical instruments, machines, etc., as well as artistic subjects. The perfection of the results obtained depends very largely upon the accuracy with which the index marks are matched against the index line and hence the use of the game tends to induce carefulness.

Various applications of this invention have been illustrated in separate drawings but it is apparent that any or all of these applications may be combined in one embodiment of the invention. The rearrangement of parts shown in Fig. 5, for instance, might be made an element of the subject in Fig. 3; and the parts in Fig. 7, might be named as well as numbered, while a color scheme may be used in any of the applications.

Having thus described my invention, I claim:

1. In a drawing device of the class described, the combination of a revolving sheet, a picture divided into parts arranged in mixed relation on said sheet, a name for some of said parts and other names on said sheet corresponding with the names on said parts, and a fixed index against which said other names may be located.

2. In a drawing device of the class described, the combination of a revolving sheet, a picture divided into parts spread over the face of said sheet, a name on some of said parts and other names on said sheet corresponding with the names on said parts and means for correctly locating parts of said picture by said other names.

3. In a drawing device of the class described, the combination of a movable member, means for restricting the direction of movement of said member, a picture divided into parts spread over said movable member in mixed relation, a mark on the edge of said movable member for each of said parts, some of said parts marked to correspond with said edge marks, the others of said parts not marked.

4. In a drawing device of the class described, the combination of a movable member, means for restricting the direction of movement of said member, a picture divided into parts spread over said movable member in mixed relation, a mark on said movable member for each of said parts and means for identifying some of said parts with said marks, the remaining parts not being so identified.

5. In a drawing device of the class described, the combination of a movable member, means for restricting the direction of movement of said member, a plurality of pictures on said member each being subdivided into parts, the parts of one of said pictures matching with the parts of another of said pictures and means associated with said movable member for positioning each of said parts to form a complete picture.

6. In a drawing device of the class described, the combination of a movable member, a picture divided into parts, spread over the face of said movable member, a series of marks on said movable member with a name for some of said marks, a fixed index matching with said marks as said member is moved, means for maintaining a fixed relation between said index and said moving member, said marks arranged with relation to said picture parts so that when each mark registers with said index a part of said picture will be correctly positioned with relation to the other parts of said picture when similarly positioned.

7. In a drawing device of the class described, the combination of a base-board and a movable member, means for maintaining a fixed relation between said movable member and said base-board, a picture divided into parts spread over said moving member in mixed relation, a series of names for some of said parts co-operating with a fixed index associated with said moving member and base-board whereby said picture may be reassembled.

8. In a drawing device of the class described, the combination of a base board, a movable member, means for maintaining a fixed relation between said movable member and said base-board, a picture divided into parts spread over said movable member, characteristic marks for some of said parts, a pad of tracing paper detachably secured to said base-board and arranged to overlap said movable member, whereby said picture parts may be transferred to a sheet of said tracing paper by using said characteristic marks as a guide.

9. In a drawing device of the class described, the combination of a base-board, a revolving disc positioned to move on a pivot on said base-board, a picture divided into parts, said parts spread over the face of said disc in mixed relation some of said parts having characteristic marks, a pad of paper detachably secured to said base-board and overlapping said disc, and means whereby said picture parts may be redrawn on a sheet of said pad as said disc is rotated by using said characteristic marks as a guide.

10. In a drawing device of the class described, the combination of a base-board, a revolving disc positioned to move on a fixed stud on said base-board, a picture divided into parts some of said parts having characteristic marks, said parts spread over said disc in mixed relation, a pad of tracing paper detachably secured to said base-board and overlapping said disc, whereby the picture parts on said disc may be redrawn on a sheet of said pad by using said characteristic marks as a guide.

11. In a drawing device of the class described, the combination of a picture sheet having picture parts thereon spaced in mixed relation with characteristic marks for some of said parts, a pad of tracing paper held in fixed relation to said picture sheet and arranged to overlap said picture sheet whereby the picture parts may be drawn on a sheet of said pad by using said characteristic marks as a guide.

12. In a drawing device of the class described, the combination of a movable member, means for restricting the direction of movement of said member, a plurality of pictures on said member sub-divided into parts some of said parts matching with each other and means associated with said movable member for positioning said parts to form an independent picture.

13. In a drawing device of the class described, the combination of a movable member, means for restricting the direction of movement of said member, a picture on said member sub-divided into parts and means associated with said member for positioning said parts whereby an independent picture may be drawn from said parts.

14. In a drawing device of the class described, the combination of a movable member, means for restricting the direction of movement of said member, a picture on said member, marks for indicating the limits of parts of said picture, and means associated with said member for positioning said parts whereby an independent picture may be drawn from said parts.

Signed at New York city, in the county of New York and State of New York, this 20th day of July, A. D. 1921.

LEON AKERBLADH.